H. A. WEAVER.
SPARE TIRE LOCK.
APPLICATION FILED MAR. 28, 1921.

1,430,707.

Patented Oct. 3, 1922.

Inventor
Harry A. Weaver,

By Hood & Schley
Attorneys

Patented Oct. 3, 1922.

1,430,707

UNITED STATES PATENT OFFICE.

HARRY A. WEAVER, OF INDIANAPOLIS, INDIANA, ASSIGNOR TO THE OAKES COMPANY, OF INDIANAPOLIS, INDIANA, A CORPORATION OF INDIANA.

SPARE-TIRE LOCK.

Application filed March 28, 1921. Serial No. 456,472.

*To all whom it may concern:*

Be it known that I, HARRY A. WEAVER, a citizen of the United States, residing at Indianapolis, in the county of Marion and State of Indiana, have invented a new and useful Spare-Tire Lock, of which the following is a specification.

The object of my invention is to produce a simple effective lock for securing automobile spare tires in place upon the car against theft.

Figure 1:
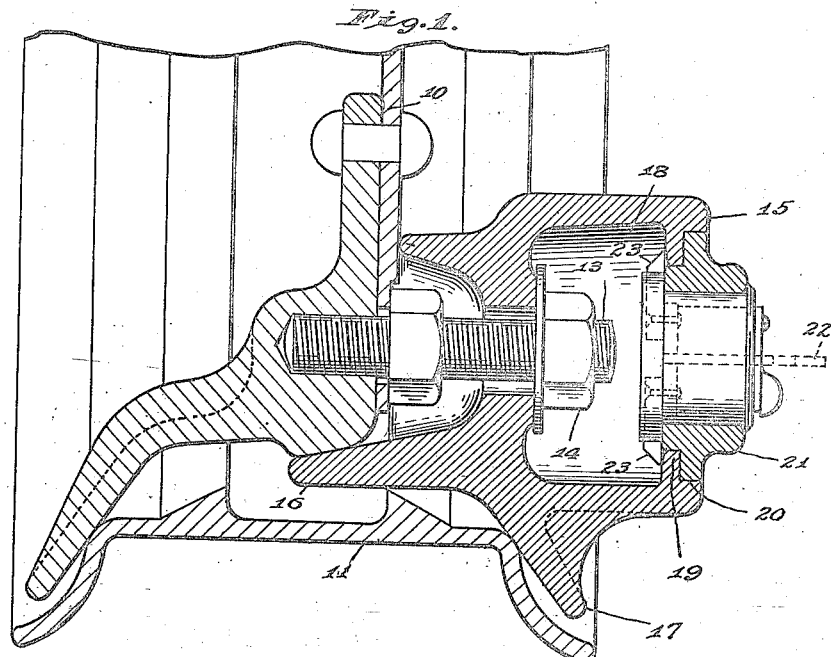
Figure 2:
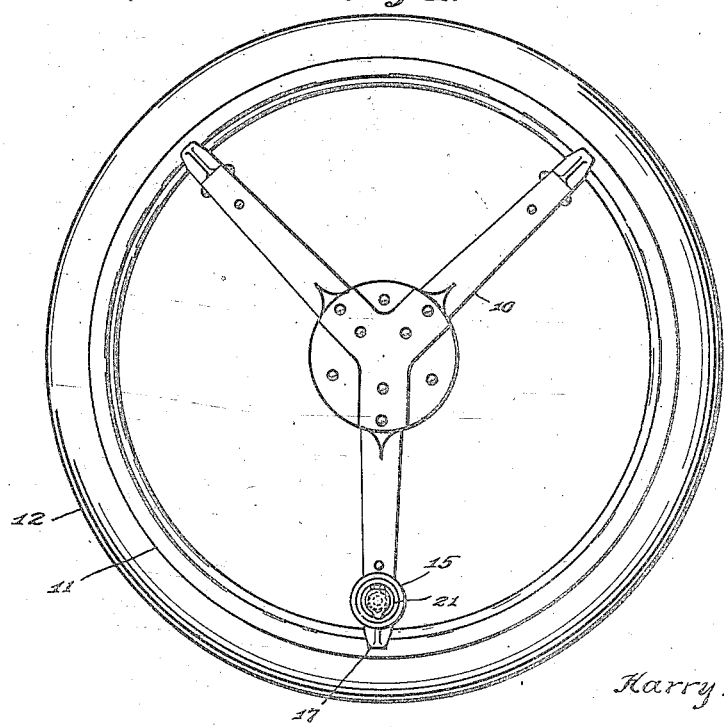

The accompanying drawings illustrate my invention: Fig. 1 is a vertical axial section of my improved lock and its adjacent parts; and Fig. 2 is an elevation on a smaller scale of a tire carrier equipped with my improvement.

In the drawing 10 indicates the usual carrying spider mounted upon the car and formed to receive the spare rim 11 carrying tire 12. The spider 10 is commonly provided at one point with a fixed bolt 13 and it has heretofore been customary to retain the spare rim 11 in place upon spider 10 by means of a wedged shaped retainer slipped upon bolt 13 and held in place by a nut 14, said retainer comprises a finger overlying the rim 11 so as to retain it in place.

In my improved construction I provide a retainer 15 having a wedge shaped finger 16 and a retaining finger 17 which, so far as these elements are concerned is substantially the same as the retainer commonly used. My retainer, however, is provided with a cup 18 having near its outer end an annular inwardly projecting flange 19, and, at its outer end a recess 20, the depth of the cup 18 being sufficient below flange 19 to contain the nut 14. Rotatably seated in recess 20 is a removable cover 21 embodying a key lock 22 having latches 23 which may take under flange 19.

The retainer 15 having been slipped over bolt 13 and brought to place by nut 14 in the usual manner, it is apparent that the nut 14 can only be manipulated by a socket wrench which is in cup 18, and the nut 14 is fully protected within the cup 18. Thereupon cover 21 may be readily slipped in place, and, being free to rotate and seated within the recess 20, it is evident that it cannot be "jimmied" and removed. In order to remove the cap the operator inserts the proper key and holds the cover 21 against rotation with his thumb until the latches 23 are retracted by the key whereupon, by still frictionally holding the cover from rotation, it may be readily withdrawn.

I claim as my invention:

1. As an article of manufacture, a retainer for spare tires comprising a cup-like main body having a tire-retaining element and provided with an opening to permit it to slip over a retaining bolt and encompass the retaining nut of a tire carrier, and a removable locked cover plate closing the open end of the cup, said cover being freely rotatable within the cup when in closed position.

2. As a new article of manufacture, a retainer for spare tires comprising a cup-like main body having a tire retaining element and provided with an opening to permit it to slip over a retaining bolt and encompass the retaining nut of a tire carrier, said body having an annular recess on its front face, and a removable locked cover plate closing the open end of said cup and fitting in said recess with its front face flush with the front edge of the cup, said cover being freely rotatable within the cup when in closed position.

3. The combination with a retaining bolt for spare tires having a retaining nut thereon, of a cup-like main body having a tire retaining element and arranged to slip over said bolt and encompass the nut, and a removable lock cover plate closing the open end of the cup, said cover being freely rotatable within the cup when in closed position.

In witness whereof, I have hereunto set my hand at Indianapolis, Indiana, this 24th day of March, A. D. one thousand nine hundred and twenty-one.

HARRY A. WEAVER.